United States Patent
Zhu et al.

(10) Patent No.: US 9,064,404 B2
(45) Date of Patent: *Jun. 23, 2015

(54) METHOD AND SYSTEM OF RADIO FREQUENCY (RF) POWER TRANSMISSION IN A WIRELESS NETWORK

(75) Inventors: Chunhui Zhu, San Jose, CA (US); Chiu Ngo, San Francisco, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 414 days.

This patent is subject to a terminal disclaimer.

(21) Appl. No.: 13/464,802

(22) Filed: May 4, 2012

(65) Prior Publication Data

US 2012/0214534 A1 Aug. 23, 2012

Related U.S. Application Data

(63) Continuation of application No. 12/329,786, filed on Dec. 8, 2008, now Pat. No. 8,194,583.

(51) Int. Cl.
*H04W 92/18* (2009.01)
*G08C 17/02* (2006.01)
*H02J 17/00* (2006.01)

(52) U.S. Cl.
CPC ............... *G08C 17/02* (2013.01); *H02J 17/00* (2013.01)

(58) Field of Classification Search
USPC ......... 370/455–448, 329, 335; 455/13.4, 270, 455/522
See application file for complete search history.

(56) References Cited

U.S. PATENT DOCUMENTS

| | | | |
|---|---|---|---|
| 4,641,126 A | 2/1987 | Crowe | |
| 5,455,466 A | 10/1995 | Parks et al. | |
| 7,817,742 B2 | 10/2010 | Suematsu et al. | |
| 7,917,093 B2 | 3/2011 | Takei | |
| 8,024,012 B2 | 9/2011 | Clevenger et al. | |

(Continued)

FOREIGN PATENT DOCUMENTS

| | | |
|---|---|---|
| CN | 1297600 A | 5/2001 |
| CN | 101252293 A | 8/2008 |

(Continued)

OTHER PUBLICATIONS

Gaur et al, "Improved Performance of CSMA/CA WLAN using a Random Inter-frame Spacing Algorithm", ACM 2006, pp. 407-411.*

(Continued)

*Primary Examiner* — Thai Nguyen
(74) *Attorney, Agent, or Firm* — Sherman IP LLP; Kenneth L. Sherman; Steven Laut (57) ABSTRACT

A method and system of radio frequency (RF) power transmission among multiple wireless stations is provided. Control signals for switching a receiving station between a power reception mode and a data reception mode are generated. The control signals provide switching information about which of the modes to switch to, and timing of the switching. In the data reception mode, the receiving station processes an RF transmission from a sending station as a data communication. In the power reception mode the receiving station processes the RF transmission as energy radiation for powering the receiving station. One type of control signal for power mode switching is generated at the MAC layer of a receiving station and sent to the PHY layer of that station for power mode switching. Another type is RTS/CTS control signal exchanged between the sending and receiving stations.

30 Claims, 10 Drawing Sheets

DIFS: Distributed Inter-frame Space, SIFS: Short Inter-frame Space, PIFS: Power Inter-frame Space

(56) References Cited

U.S. PATENT DOCUMENTS

| | | | |
|---|---|---|---|
| 2002/0044549 A1* | 4/2002 | Johansson et al. | 370/386 |
| 2004/0130915 A1 | 7/2004 | Baarman | |
| 2007/0109121 A1* | 5/2007 | Cohen | 340/539.26 |
| 2008/0056133 A1* | 3/2008 | Deshpande et al. | 370/235 |
| 2008/0132206 A1* | 6/2008 | Suzuki | 455/411 |
| 2008/0252254 A1 | 10/2008 | Osada | |

FOREIGN PATENT DOCUMENTS

| | | |
|---|---|---|
| JP | 2005229150 A | 8/2005 |
| WO | 2007129737 A1 | 11/2007 |

OTHER PUBLICATIONS

U.S. Notice of Allowance for U.S. Appl. No. 12/490,222 mailed Nov. 19, 2012.

U.S. Final Office Action for U.S. Appl. No. 13/841,643 mailed Feb. 25, 2014.

U.S. Non-Final Office Action for U.S. Appl. No. 12/490,222 mailed May 21, 2012.

U.S. Notice of Allowance for U.S. Appl. No. 13/841,643 mailed Jun. 10, 2014.

Chinese Office Action dated Jun. 7, 2013 for Chinese Application No. 200980149288.6 from China Intellectual Property Office, pp. 1-22, People's Republic of China (English-language translation included, pp. 1-15).

U.S. Non-Final Office Action for U.S. Appl. No. 13/841,643 mailed Jul. 16, 2013.

Chinese Office Action dated Feb. 25, 2014 for Chinese Application No. 200980149288.6 from China Intellectual Property Office, pp. 1-24, People's Republic of China (English-languaged translation included, pp. 1-15).

European Search Report dated Apr. 4, 2014 for European Patent Application No. 09832050.0 from the European Patent Office, pp. 1-7, Munich, Germany.

U.S. Advisory Action for U.S. Appl. No. 13/841,643 mailed Apr. 30, 2014.

Japanese Office Action dated Oct. 1, 2013 for Japanese Application No. 2011-539444 from Japan Patent Office, pp. 1-5, Tokyo, Japan (English-language translation included, pp. 1-3).

\* cited by examiner

CAP — contention access period,  CFP — contention-free period

NAV: Network Allocation Vector, DIFS: Distributed Inter-frame Space,
SIFS: Short Inter-frame Space

METHOD AND SYSTEM OF RADIO FREQUENCY (RF) POWER TRANSMISSION IN A WIRELESS NETWORK

CROSS-REFERENCE TO RELATED APPLICATIONS

This application is a continuation of U.S. patent application Ser. No. 12/329,786 filed on Dec. 8, 2008, incorporated herein by reference.

FIELD OF THE INVENTION

The invention relates generally to power transmission, and in particular, to power and data transmission to the same device via radio frequency (RF) radiation.

BACKGROUND OF THE INVENTION

With the proliferation of mobile electronic devices, many wireless devices are necessarily powered by batteries. For example, devices in wireless local area network (WLAN) or wireless personal area network (WPAN) mesh networks are battery powered. In such networks, the number of nodes may be very large. One of the technical challenges for sustaining wireless mesh networks is maintaining batteries for hundreds, or even thousands, of nodes in a network. Current battery technology requires the battery of a wireless sensor node to be changed every several days or at most every several months. This is an obstacle for widespread adoption of wireless mesh networks.

BRIEF SUMMARY OF THE INVENTION

The invention provides a method and system of radio frequency (RF) power transmission in a wireless network including multiple wireless stations. One embodiment includes: generating control signals for switching a receiving wireless station between a power reception mode and a data reception mode, the control signals providing switching information including information about which of the modes to switch to, and information about timing of the switching; switching the wireless station between power reception and data reception modes based on the control signal; wherein in the data reception mode, the receiving wireless station processes an RF transmission from a sending wireless station as a data communication, and in the power reception mode the receiving wireless station processes the RF transmission as energy radiation for powering the receiving wireless station. Two types of control signals may be used for power mode switching. The first type is generated at the media access control layer (MAC) layer of a receiving station and sent to the physical (PHY) layer of that station for power mode switching. The second type is Request To Send/Clear To Send (RTS/CTS) and it is exchanged between the sending station and receiving stations, at the MAC layer. This type of signal also needs to be sent to the PHY layer to control the switching between data reception mode and power reception mode.

These and other features, aspects and advantages of the present invention will become understood with reference to the following description, appended claims and accompanying figures.

DETAILED DESCRIPTION OF THE INVENTION

The invention provides a method and system for transmitting electrical charge to a charge storage unit of a device, and information delivery to the same device, using radio frequency (RF) radiation. One embodiment provides a process for cross-layer control of RF power transmission in an RF wireless network. The control process allows both wireless communication and power transmission using a single, common antenna. The invention provides control signals to an integrated wireless power and data transmission module. The control signals enable the integrated wireless power and data transmission module to operate in a wireless network such as a network having a star or mesh (i.e., peer-to-peer) topology.

The control signals represent control information enabling devices (e.g., wireless stations or nodes) that include an integrated wireless power and data transmission module, to switch between a power receiving mode and a data communication mode (i.e., power mode switching). In one example star communication network, a coordinator station (or master device) is the power transmitter as well as the central controller of the communication network. Beacon frames transmitted by the coordinator are utilized by receiving devices in the network to control the timing of switching between power receiving mode and data communication mode. In a mesh network, because there is no coordinator/master device, the devices in the network are charged by data transmissions occurring in their neighborhood and/or other devices scattered in the network. Said control signals enable the receiving devices in a network to determine when to switch modes (between power receiving mode and data communication mode), and which mode to switch to. This allows the receiving devices to avoid conflict between energy reception and data communication, and to thereby avoid missing data messages from other devices.

In one example, this allows charging the rechargeable batteries of wireless nodes in a star or mesh topology network. A node may recharge its batteries by receiving power transmission from the coordinator or master device in a star network, or overhearing (receiving) data transmissions among other nodes in a mesh network and using such received data transmissions as power transmissions, or receiving power transmissions from mains powered neighbor devices (e.g., devices powered by electric power from an AC outlet, which may be converted to DC power first) in a mesh network. As noted, in a star network, beacon frames from a coordinator are used to control the timing of switching between the data communication and power transmission modes at a each node in the network. In a mesh network, a RTS/CTS (Request To Send/Clear To Send) protocol may be utilized to establish the timing for switching between the two modes. Further, an inter-frame guard time is implemented as a power inter-frame space (PIFS), to allow mains powered devices to charge battery powered devices in mesh networks.

Figure 1:
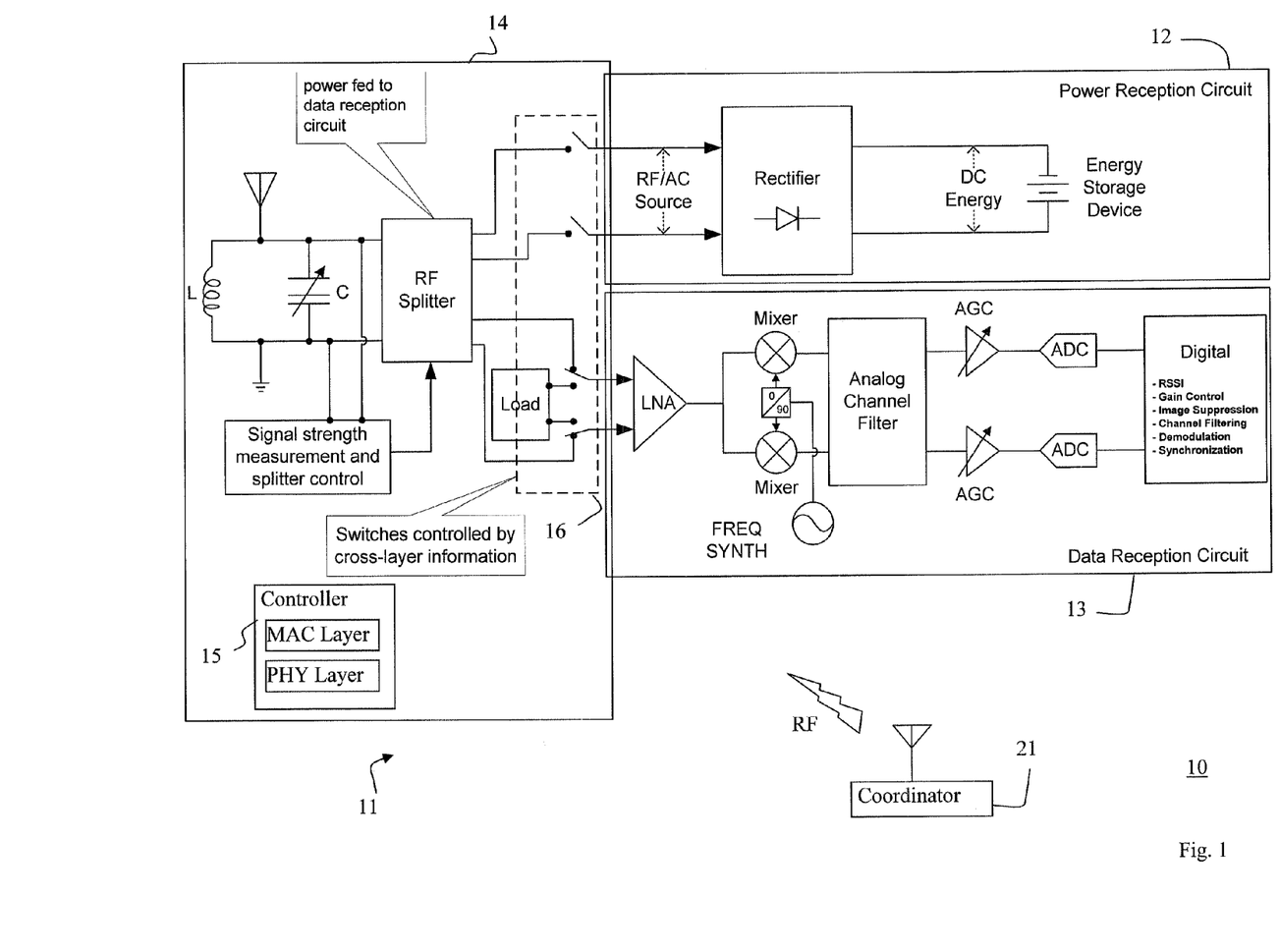
FIG. 1 shows a functional block diagram of a wireless device implementing transmitting electrical charge to a charge storage unit of the wireless device, and information delivery to the same device, using radio frequency (RF) radiation, according to an embodiment of the invention.

FIG. 1 shows an example communication system 10 including a wireless node 11 comprising a power reception circuit 12, a data reception circuit 13 and an interface 14 (including a Radio Frequency (RF) front end circuit) that switches modes between the power reception circuit and the data reception circuit based on a control signal generated by a controller 15 in the station, according to an embodiment of the present invention. The interface 14 can switch to the power reception mode whenever possible and without negatively affecting data communication. In the example shown in FIG. 1, the interface 14 comprises a switch module 16 that is in the data reception mode, wherein all the received RF power is fed to the data reception circuit 13. The controller 15 determines when to switch between data communication and energy (power) reception.

In one embodiment, the MAC layer of a wireless station which functions as the controller 15, generates said control signals, and the PHY layer of the wireless station functions as a communication module for RF communication. The control signal is generated at the MAC layer of a wireless station and transmitted from the MAC layer to the PHY layer of the wireless station (i.e., cross-layer control) to perform for power mode switching.

In one implementation, MAC layers in nearby wireless stations (nodes) cooperatively determine which node pairs may use a shared communication media (e.g., communication channel) at a given time period. According to an embodiment of the invention, when a node is prohibited from transmitting or receiving data during a time period, then it may switch to power reception mode without affecting data communication. In the following, examples of mode switching are described for nodes in star and mesh (peer-to-peer) topologies, according to embodiments of the present invention.

Star Network Topology

Figure 2A:
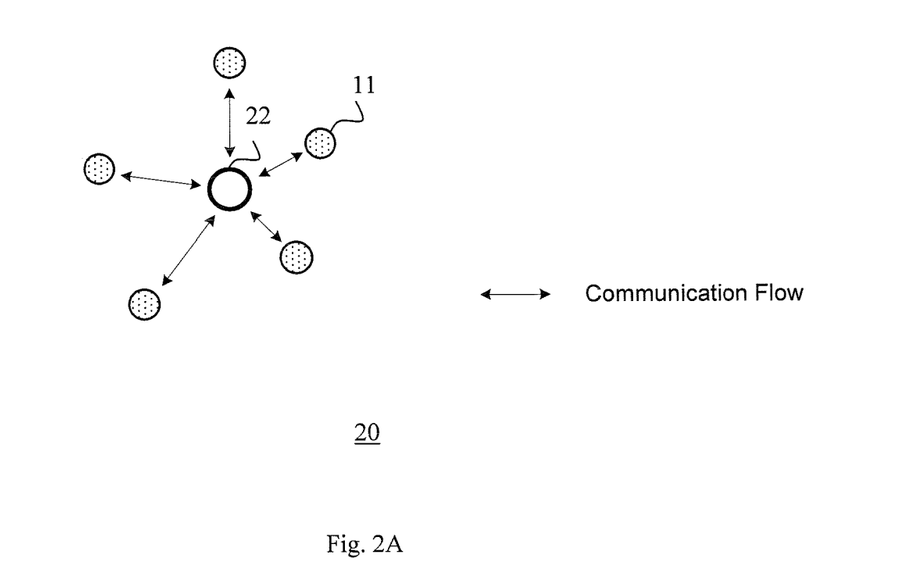
FIG. 2A shows a star topology wireless network, according to an embodiment of the invention.

Referring to FIG. 2A, a star network topology 20 includes a central controller 22 (implementing a coordinator function) and one or more wireless devices (nodes) 11. Examples implementations of star topology include WLAN Access Point (or Wireless Router) and WLAN devices, Piconet Coordinator of a WPAN network and devices, Bluetooth master and slave devices. In the following description, the terms "coordinator" or "master device" are used to designate the central controller 22, and the terms "slave device" or "simply device" are used to designate the devices 11 in the star network which are not the central controller.

The controller 22 provides a communication schedule (superframe structure) which device(s) 11 utilize to transmit or receive data at a given time period via one or more wireless communication channels.

Every device 11 includes the functionality of the controller 15. A star topology coordinator (or master) does not require such functionality because a coordinator is a power transmitter and does not require RF power. The coordinator is typically mains powered and does not require a power reception circuit. In mesh topology, the coordinator should be able to receive RF power as such mesh coordinator may not be mains powered. The coordinator determines a superframe structure for access to a shared channel. Once a device 11 (wireless station) is informed of the superframe structure (by listening to beacons), the device can switch between data receiving mode and power receiving mode accordingly. Each device 11 determines when to switch based on the information obtained from the beacons it receives from the coordinator.

The interface 14 in each device 11 controls the switches 16 according to the communication schedule determined at the MAC layer, such that the interface 14 switches the device 11 to one of the two modes specified by the control signals, at a time (and for a duration) specified by the control signals. The functionality of controlling the switches 16 may be implemented in a MAC layer of each device 11.

In most cases, communications between any two devices 11 may need to be relayed by the coordinator 21, even when the two devices 11 are within the communication range of one another (so-called indirect communication). When applying wireless power transmission to the network 20 according to an embodiment of the invention, it is assumed that the coordinator 21 is mains powered and is able to transmit power to devices 11 when the coordinator 21 is not transmitting data. Furthermore, when the coordinator 21 transmits data to a selected device 11, one or more of non-selected devices 11 may switch to power reception mode and treat the data transmission from the coordinator 21 to the selected device as a power source. As such, for the same data transmission, the selected device receives the transmission from the coordinator as data while the non-selected devices receive the same transmission as energy to recharge their batteries, for example).

Superframe Structure for Communication Scheduling

Figure 3:
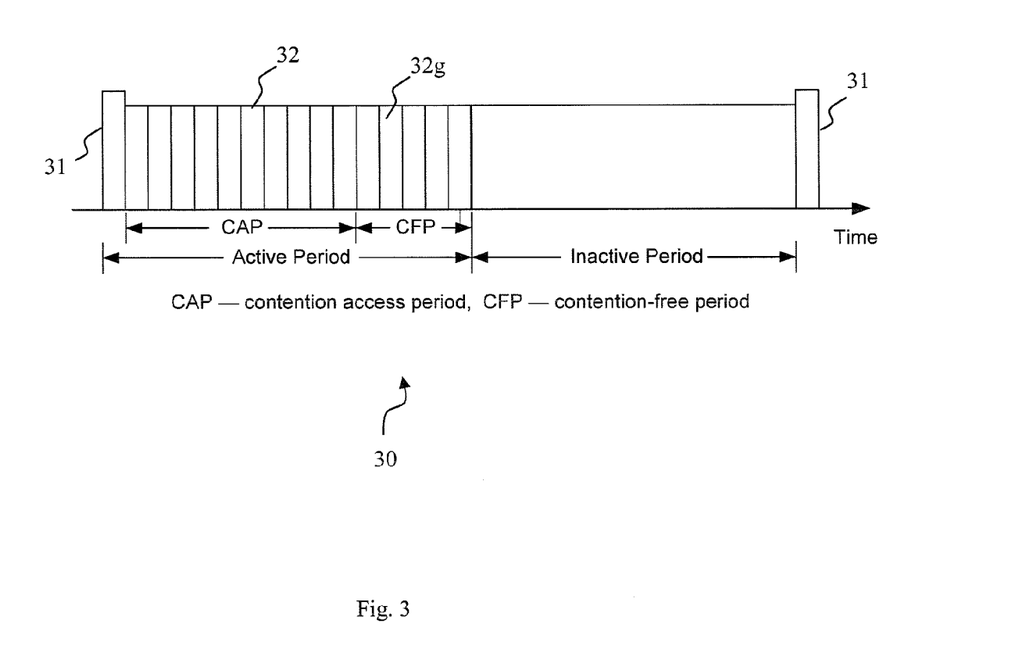
FIG. 3 shows a superframe scheduling format for access to a wireless communication medium for transmitting electrical charge to a charge storage unit of a wireless device, and information delivery to the same device, using RF radiation, according to an embodiment of the invention.

In one embodiment, an IEEE 802.15.4 (LR-WPAN) communication standard is used for the star network 20. The LR-WPAN standard can operate in a totally unarranged mode (contention-based slotted CSMA/CA) or optionally under a superframe structure. For wireless power transmission, in a preferred embodiment, a superframe structure 30 is utilized as shown in FIG. 3. The format of the superframe 30 is defined by the coordinator 21, which in this example, is also the power transmitter. Each superframe 30 begins at a beacon 31, wherein the beacons are transmitted by the coordinator 21. In this example the superframe 30 is divided into sixteen equally sized time slots 32. A beacon 31 is transmitted in the first slot of each superframe.

For a personal area network (PAN), the beacons 31 are used to synchronize the devices 11, to identify the scheduled PAN devices 11, and to describe the structure of the superframes. Any device 11 wishing to communicate during a contention access period (CAP) between two beacons 31 competes with other devices 11 using a slotted CSMA-CA mechanism. All transmissions scheduled during a current superframe need to be completed by the time of the next network beacon. For low-latency applications or applications requiring specific data bandwidth, the PAN coordinator 21 may dedicate certain slots of the active superframe 30 to such applications. Such slots 32g are termed guaranteed time slots (GTSs). The GTSs form a contention-free period (CFP), which always appears at the end of the active superframe starting at a slot boundary immediately following the CAP. The PAN coordinator may allocate up to seven GTSs, and a GTS may occupy more than one slot period. When GTS is used, all contention-based transactions need to be completed before the CFP begins. Further, each device 11 transmitting in a GTS needs to ensure that its transaction is complete before the time of the next GTS or the end of the CFP.

The superframe 30 may include active and inactive periods. In existing systems, both the coordinator 21 and the PAN devices 11 may enter a low-power mode during the inactive period. When the coordinator is used for wireless power transmission, the coordinator transmits power to the PAN devices during the inactive period because then no devices 11 transmit or receive any data during such periods.

In a network with star topology there are two types of data transactions. One is data transfer to a coordinator in which a device transmits the data, and the other is data transfer from a coordinator in which a device receives the data. Direct data exchange between two devices is not allowed in star topology of LR-WPAN.

When a device wishes to transfer data to a coordinator in a beacon-enabled network, the device first detects the network beacon. When the beacon is detected, the device synchronizes to the superframe structure. At the appropriate point, the device transmits a data frame to the coordinator using slotted CSMA-CA. The coordinator acknowledges successful reception of the data frame by transmitting an optional acknowledgment frame. That transaction is now complete.

When the coordinator wishes to transfer data to a device in a beacon-enabled network, the coordinator indicates in beacon that data message is pending. The device periodically listens to the network beacon and, if a message is pending, the device transmits a MAC command requesting the data, using slotted CSMA-CA. The coordinator acknowledges successful reception of the data request by transmitting an optional acknowledgment frame. The pending data frame is then transmitted from the coordinator to the device using slotted CSMA-CA. The device acknowledges successful reception of the data by transmitting an acknowledgment frame. The transaction is now complete. Upon receiving the acknowledgement, the message is removed from the list of pending messages in the beacon.

Data Transmission Model with Power Transmission
  The Coordinator
    According to an embodiment of the present invention, if the GTS in the superframe is not used, the coordinator 21 does not transmit pure power (RF waveform without carrying any information) before the CAP ends, even when there is no data to send to the devices 11. This is because the devices 11 may have data to send to the coordinator 21, and as such the coordinator 21 remains in data communication mode. If the GTS is used, the coordinator 21 extends its stay in the data communication mode until the communication in the GTS slots ends. Even when the coordinator 21 is not transmitting power, one or more devices 11 can receive power from data communications between the coordinator 21 and other devices 11, as long as said one or more devices are in power reception mode.
  The Devices
    The devices 11 periodically listen for beacons in the data communication mode. If upon detecting a beacon a device 11 determines that it has a message pending from the coordinator (carried by the beacon payload field), the device follows a usual standard to retrieve the data from the coordinator during the superframe period starting at a detected beacon. After receiving the data, the device 11 can switch to power receiving mode if it has no data to send to the coordinator during this superframe period. Otherwise, according to the invention, the device 11 first sends the data to the coordinator 21 and then switches to the power receiving mode. Once switched to the power receiving mode, the device 11 stays in that mode until just before the next beacon time.

If the device 11 detects that it does not have messages pending from the coordinator, the device 11 can switch to power receiving mode immediately if it has no data to send to the coordinator during this superframe period. Otherwise, the device first sends the data to the coordinator and then switches to the power receiving mode. Once switched to the power receiving mode, the device 11 stays in that mode until just before the next beacon time. If GTS slots in a superframe are assigned for a device 11, the device stays in the data communication mode until it finishes the data communication using GTS slots. The device 11 can then switch to a power receiving mode.

Figure 4:
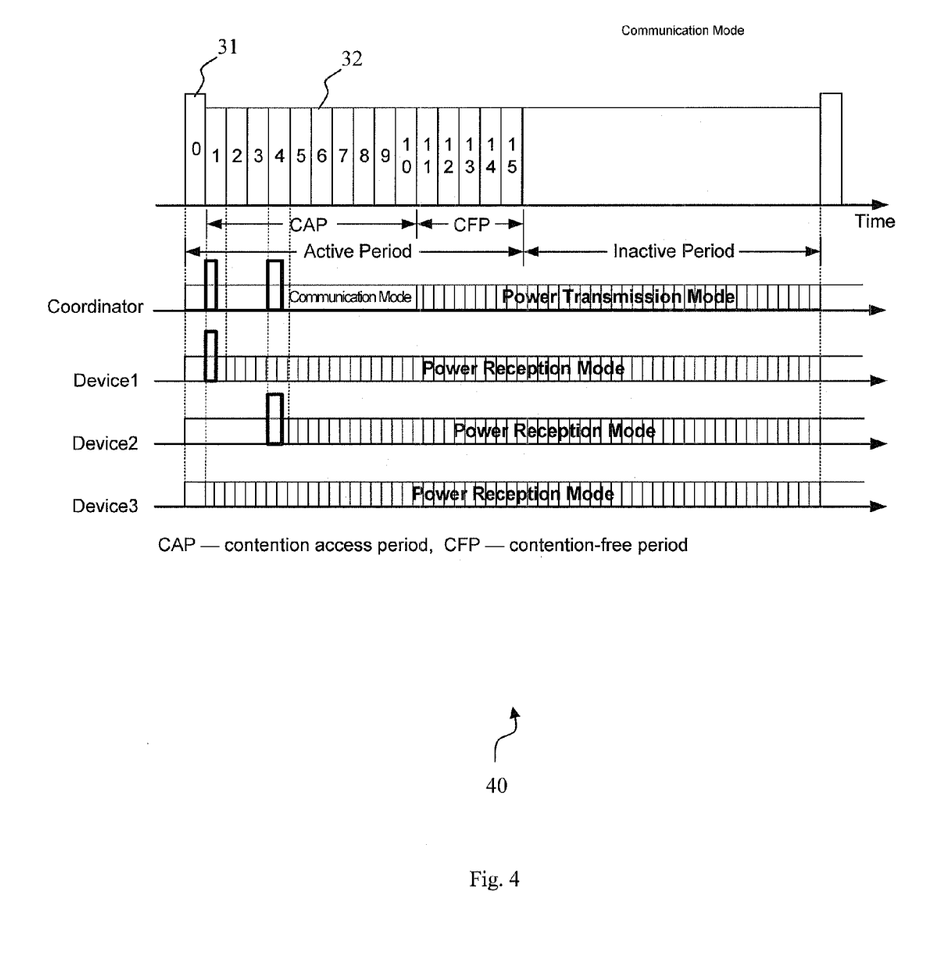
FIG. 4 shows a superframe scheduling format for data and power transmission without use of guaranteed time slots (GTS) for access to a shared wireless communication medium, according to an embodiment of the invention.

FIG. 4 shows an example superframe 40 for data and power transmission without use of GTS slots, according to an embodiment of the invention. When GTS slots are not used, the coordinator 21 stays in the communication mode until the CAP ends. After CAP, the coordinator 21 can start transmitting pure power until the end of the inactive period.

If a Device1 among devices 11 has data to send to the coordinator 21, and slot1 of the superframe 40 is used for transmission, then at the end of slot1 the Device11-1 can switch to the power reception mode. If a Device2 among devices 11 has a data message from the coordinator 21, and slot4 is used to retrieve the data from the coordinator 21, then at the end of slot4, the Device11-2 can switch to the power reception mode. If a Device3 among devices 11 has no data to send to the coordinator 21 and no data to receive from the coordinator, then Device11-3 can switch its receiver circuitry to power reception mode immediately after the beacon message is received and checked by the Device11-3.

Between slot0 and slot10, the coordinator 21 remains in the data communication mode. However, devices 11 are able to receive power from transmissions of each other. For example, in slot1, when Device11-1 is transmitting, Device11-3 may be able to receive the data message transmission. Since Device11-3 is in the power reception mode in the same time period, the Device11-3 treats the received RF signal as power transmission and uses it to charge its energy storage device. As another example, in slot4, when the coordinator 21 is transmitting data to the Device11-2, both Device11-1 and Device11-3 are in the power reception mode, whereby they can receive and store the energy of the transmission.

Figure 5:
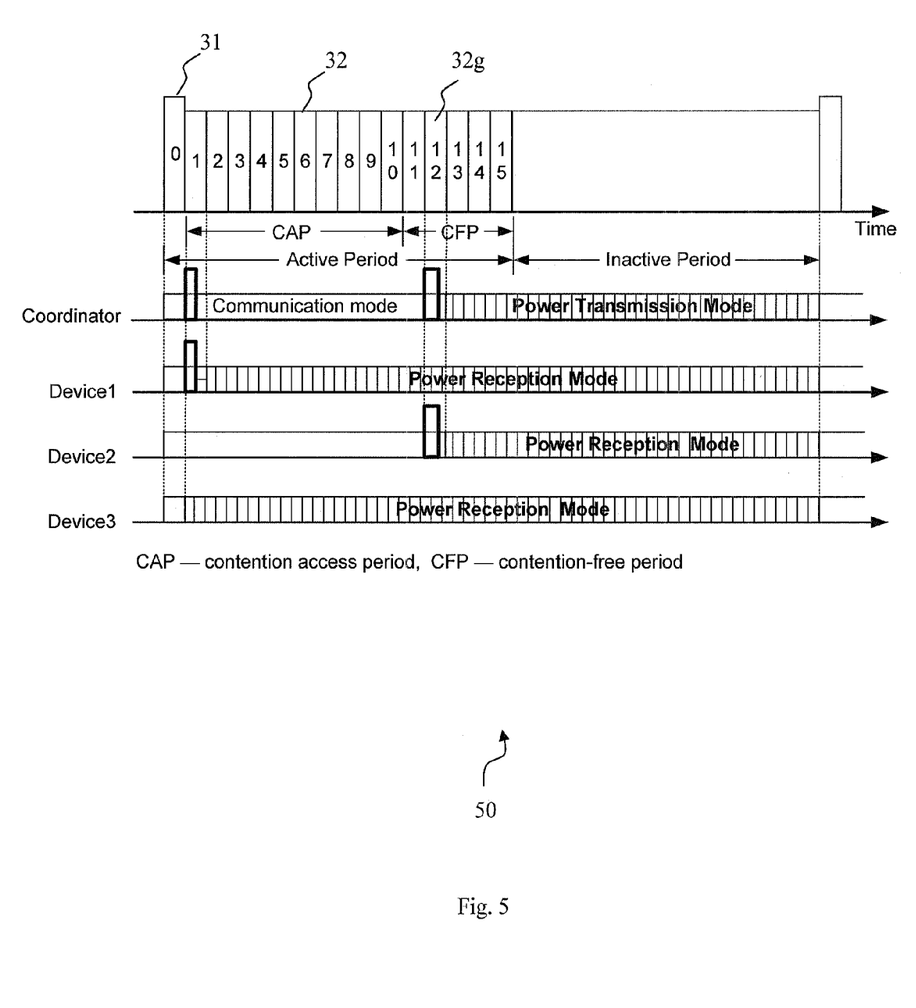
FIG. 5 shows a superframe scheduling format for data and power transmission using one or more GTSs for access to a wireless communication medium, according to an embodiment of the invention.

FIG. 5 shows an example superframe 50 for data and power transmission where GTS slots 32g are used, according to an embodiment of the invention. If one or more devices use GTS slots 32g, the coordinator 21 stays in the communication mode until the communication in the GTS slots end. Thereafter, the coordinator 21 can start transmitting pure power until the end of the inactive period.

If Device11-1 has data to send to the coordinator 21 during CAP, and slot1 of the superframe 50 is used for that transmission, then at the end of slot1 the Device1 can switch to the power reception mode (same as in superframe 40 in FIG. 4). If Device11-2 has a data message from the coordinator a GTS slot (e.g., slot12) is assigned for retrieving that message from the coordinator. Only at the end of slot12 can the Device2 switch to the power reception mode. The Device11-3 operates in similar fashion as that in superframe 40.

Optionally, in superframe 50 the Device2 can switch to power reception mode during the CAP and then switch back to the communication mode before slot12 if it has nothing to send to the coordinator 21 during the CAP. However, since the coordinator is not sending power during the CAP, the Device2 can only receive power from other devices 11 or the coordinator when they transmit data.

The Device11-2 may utilize certain information to determine whether it should switch to power reception mode during the CAP. For example, the Device11-2 can check the beacon payload for a pending address list to determine the number of devices which need to communicate data with the coordinator. If that number is non-zero, then the Device2 may switch to power reception mode to utilize RF energy of at least several transmissions between the coordinator and the other devices.

Mesh Network Topology

Figure 2B:
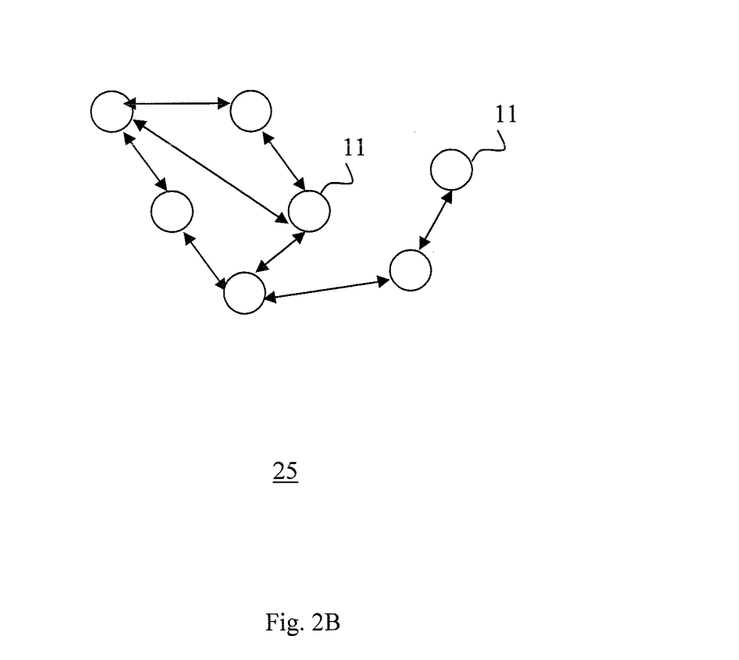
FIG. 2B shows a mesh (peer-to-peer) wireless network, according to an embodiment of the invention.

In one example mesh network (peer-to-peer network), such as network 25 in FIG. 2B, all devices 11 in the network are battery powered, while in another example one or more devices 11 in the network 25 are mains powered.

As noted, in a mesh network a coordinator function is not utilized. All devices in the network are equal so far as data communication is concerned. Data may be exchanged between any two devices on the network without the presence of a coordinator.

The devices 11 implement functionality of said controller 15 (FIG. 1), by utilizing a communication protocol that determines which device(s) 11 may transmit or receive data at a given time period via one or more wireless communication channels. The interface 14 in each device 11 controls the switches 16 according to the communication schedule. The functionality of controlling the switches 16 may be implemented in a MAC layer of each device 11.

A GTS mechanism is not utilized, rather either beacon-enabled (with superframe structure) or non-beacon-enabled (without superframe structure) protocols may be used. For a beacon-enabled mesh network, communication of data is scheduled such that the approach described earlier for star network may also be applied, according to an embodiment of the invention.

For a non-beacon mesh network, every device may communicate with every other device in its radio sphere of influence. For effective communication, in a synchronous wireless mesh network the devices either synchronize with each other (including using beacons), or in an asynchronous wireless mesh network the devices can receive data whenever it is sent. In the former case, synchronization is required, wherein in one example, devices manage their schedules for data communication and power reception, in a similar fashion described above. In the latter case (i.e., asynchronous wireless mesh network), the devices can simply transmit data using unslotted CSMA-CA, but their data communication circuits (transceivers) remain on.

In an asynchronous wireless mesh network, wherein all the devices in the network are battery powered, the only power sources are the RF data transmissions from neighbor devices. In such a network, data communications may occur randomly, therefore transmission of pure power must be scheduled. Further, pure power transmission in adjacent bands is not favorable because adjacent bands in use by other networks may be jammed. However, a device can receive RF power from neighboring devices when they are transmitting, if that device selectively switches between data communication and power reception modes. In one example, a request to send (RTS)/clear to send (CTS) protocol is utilized to implement switching to power reception mode in the network. RTS/CTS reduces frame collisions introduced by the hidden terminal problem and exposed device problem, such as in IEEE 802.11 wireless communication). Example frame formats defined in IEEE 802.11 for RTS and CTS are illustrated in FIG. 6 and FIG. 7, respectively.

Figure 6:
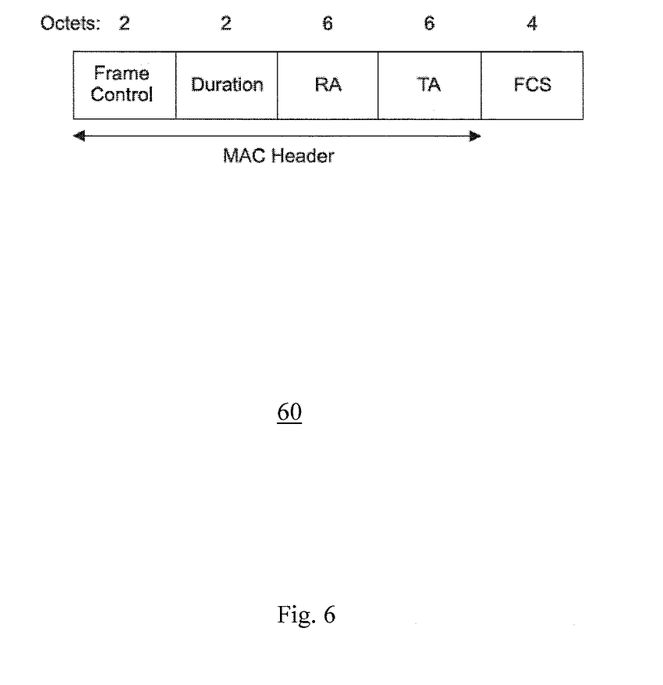
FIG. 6 shows a request to send (RTS) scheduling frame structure for access to a wireless communication medium.

In the RTS frame 60 shown in FIG. 6, the Duration value is the time period required (in microseconds) to transmit pending data or management frame, one CTS frame, one ACK frame, and three short inter-frame space (SIFS) intervals. The RA (receiver address) of the RTS frame is the address of the device that is the recipient of the pending directed data or management frame. The TA (transmitter address) is the address of the device transmitting the RTS frame.

Figure 7:
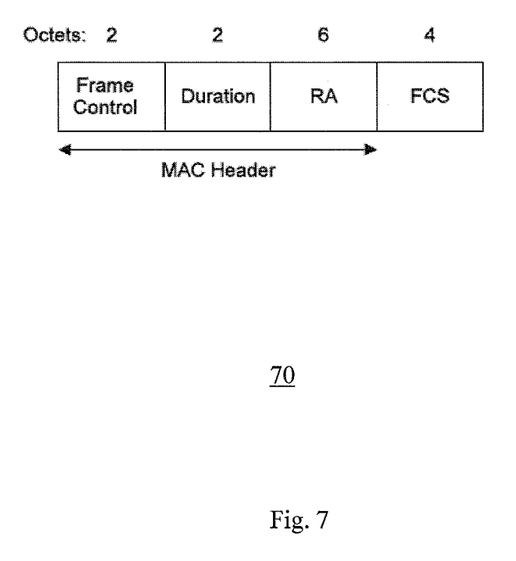
FIG. 7 shows a clear to send (CTS) scheduling frame structure for access to a wireless communication medium.

In the CTS frame 70 shown in FIG. 7, the Duration value is the value obtained from the Duration field of the immediately previous RTS frame, minus the time period required to transmit the CTS frame and its SIFS interval. The RA of the CTS frame is copied from the TA field of the immediately previous RTS frame to which the CTS is a response.

A sender device wishing to send data to a destination (target) receiver device initiates the process by sending an RTS frame. The destination device replies with a CTS frame. Any other device receiving the CTS frame refrains from sending data for a given time period (addressing the hidden device problem). The amount of time a device should wait before attempting to access the communication medium (e.g., wireless RF channel) is included in both the RTS and the CTS frames (i.e., in the Duration fields). Any other device receiving the RTS frame, but not the CTS frame, is permitted to transmit to other neighboring devices (addressing the exposed node problem).

RTS and CTS frames provide the remaining network devices (i.e., devices other than the data sender and receiver devices), with information including:
  Only a specified device (i.e., sender device) will transmit during a reserved channel time period.
  The other devices cannot transmit because a device has reserved the channel.
  The other devices are not the destination for said transmission (e.g., a data packet) during the reserved period.
  The length of the reserved transmission time.
  During the reserved transmission time, the other will not receive any data frames destined to them from other nodes.

Therefore, said remaining devices may switch to power reception mode to receive power from the transmission by the data sender. Only devices that received the RTS frame can receive the power transmitted by the sender device. Those nodes only receiving the CTS cannot receive the transmission.

As such, according to the invention, two types of control signals may be used for power mode switching. The first type is generated at the MAC layer of a receiving station and sent to the PHY layer of that station for power mode switching. The second type is RTS/CTS and it is exchanged between the sending station and receiving stations, described hereinbelow.

Figure 8:
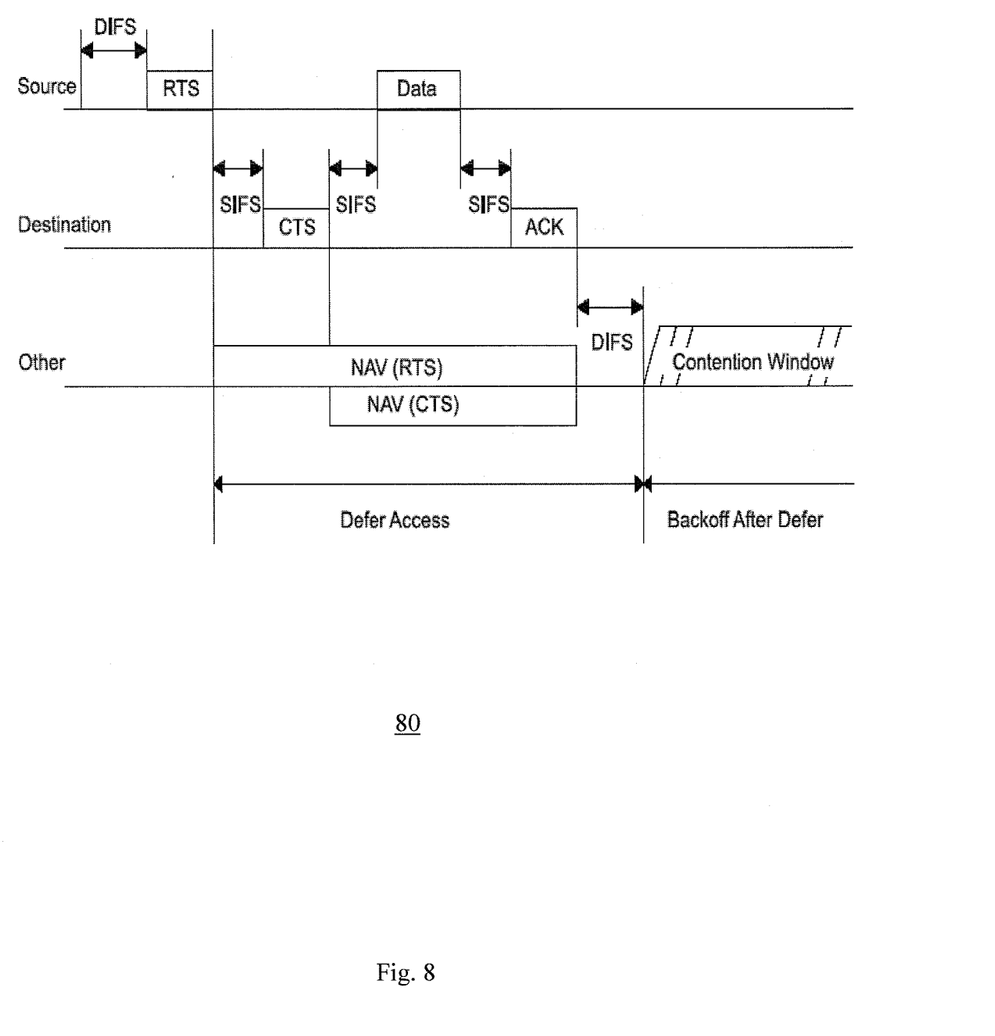
FIG. 8 shows an example communication protocol using RTS/CTS frames and a network allocation vector (NAV) indicator for access to a wireless communication medium.
Figure 9:
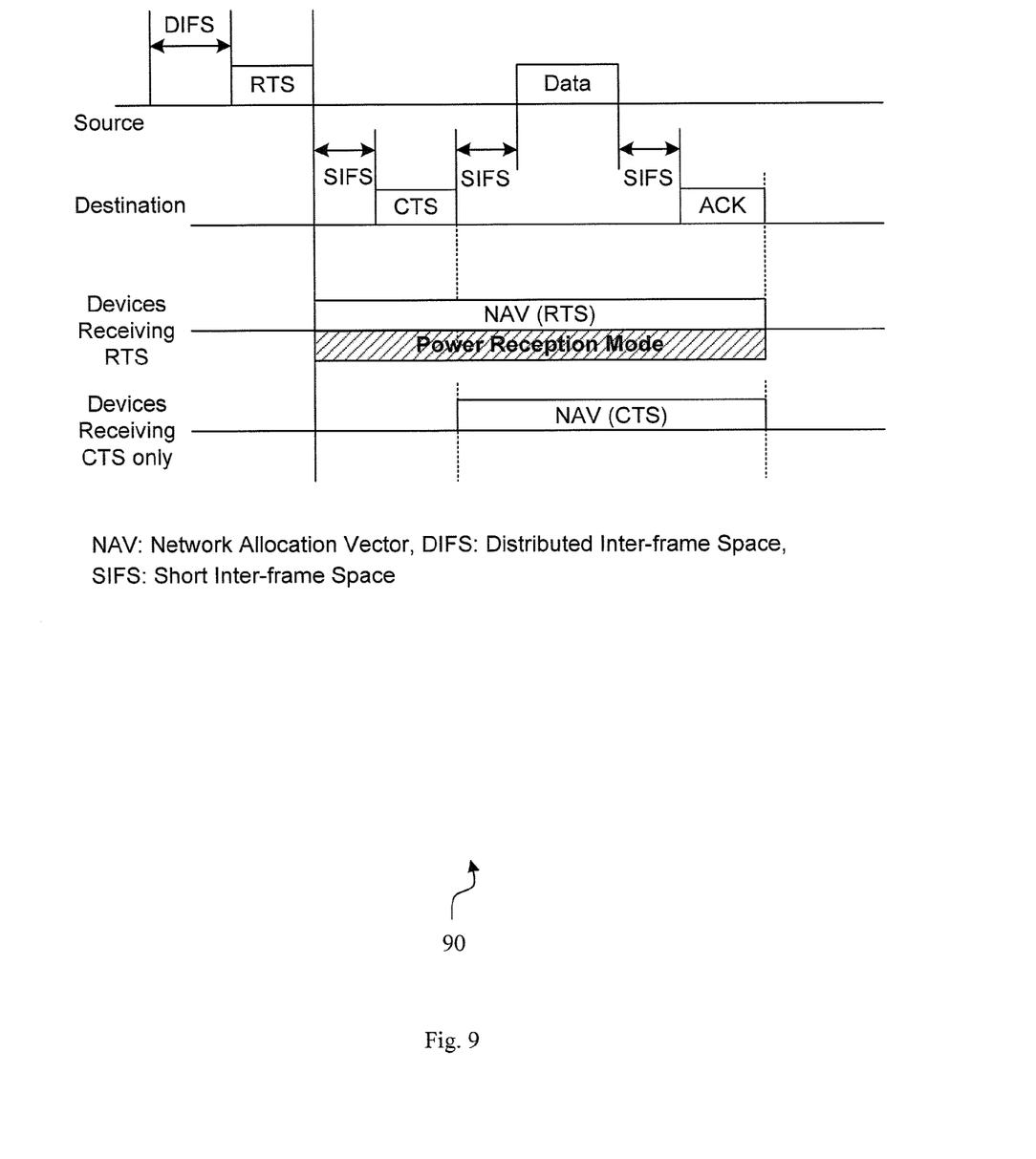
FIG. 9 shows a communication protocol using RTS/CTS frames and a NAV indicator for power reception in a mesh network, according to an embodiment of the present invention.

FIG. 8 provides an example protocol 80 using RTS/CTS frames and a network allocation vector (NAV) indicator. The NAV indicator, maintained by each device, indicates those time periods when transmission onto the communication medium (e.g., wireless medium (WM)) will not be initiated by a device, whether or not a clear channel assessment (CCA) function of the device senses that the wireless medium is busy. The protocol 80 is utilized in an example process 90 shown in FIG. 9 for power reception in a mesh network, according to an embodiment of the present invention. Specifically, FIG. 9 shows the appropriate time period where devices can receive power from a data transmission of a sender device (source). Because the devices are not to transmit while they are in the NAV, all devices receiving the RTS frame immediately enter the NAV period. There will not be any devices that transmit during the NAV except the sender source of the RTS frame. Therefore, all devices receiving the RTS can switch to power reception mode, and need not be concerned with missing any data communication. By switching to the power reception mode during the NAV period, the devices can be charged by data transmission of other devices.

In an asynchronous wireless mesh network, wherein one or more devices in the network are battery powered while one or more other devices are mains powered (i.e., mixed-power network), the mains powered devices transmit power to battery powered devices when no devices are transmitting data in the neighborhood. In an example mixed-powered mesh network, one or more devices are mains powered and the rest are battery powered.

To prevent battery powered devices from transmitting data packets during power transmission, the communication medium is reserved for power transmission, while preserving priority of data communication over power transmission. A power inter-frame space (PIFS) interval is implemented, wherein the PIFS interval is longer than the distributed inter-frame space (DIFS) interval such that the RTS frame for power transmission is always sent when no RTS frame for data transmission is received after the previous data communication in the neighborhood.

Figure 10:
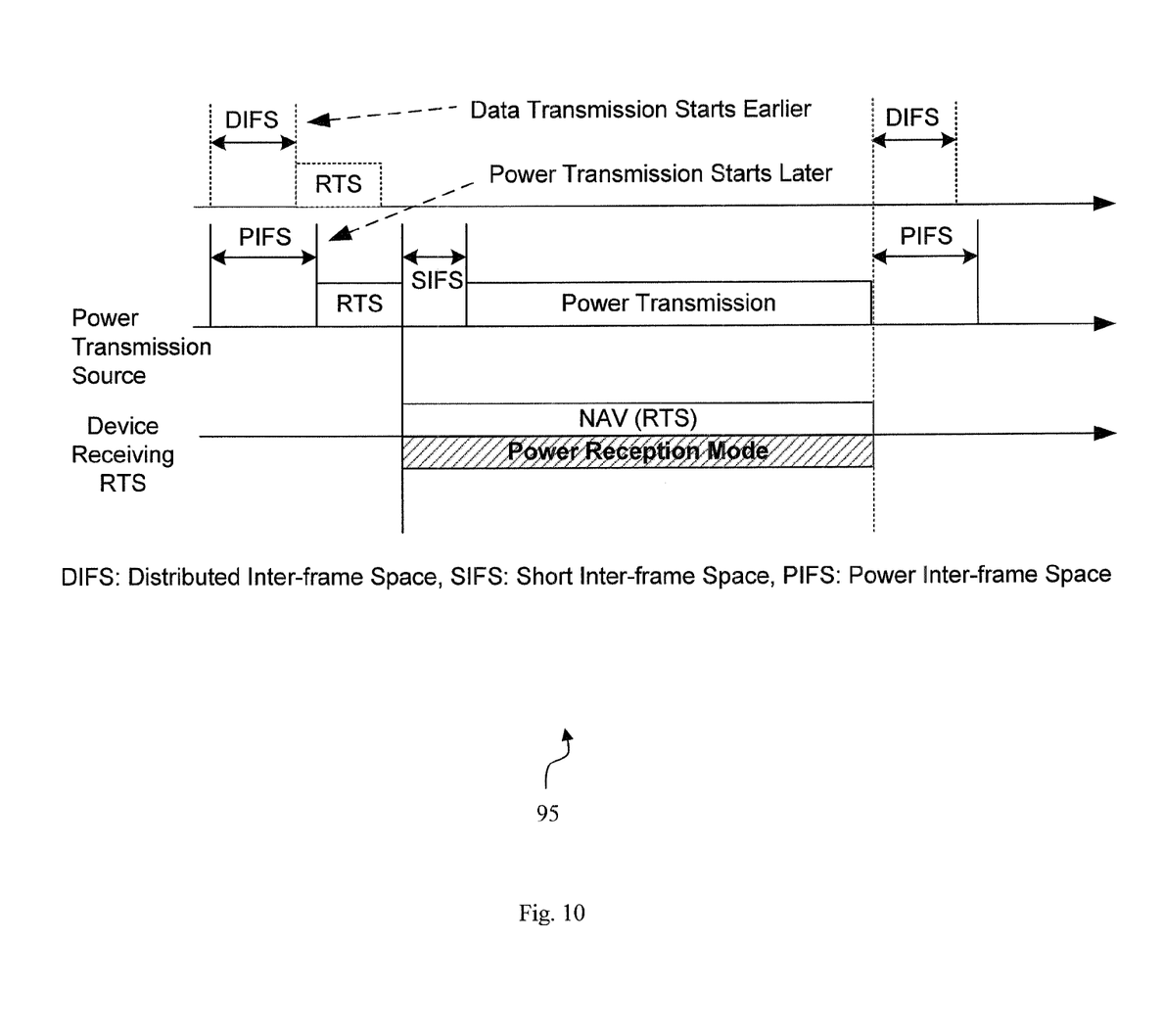
FIG. 10 shows a communication protocol using RTS/CTS frames and a NAV indicator for power reception in a mesh network, according to an embodiment of the present invention.

Referring to the example protocol 95 in FIG. 10, in one implementation according to the invention, the power transmitter (source) may wait for a time period slightly longer than the DIFS interval before it transmits the RTS frame for power transmission. The above protocol 95 only applies to the power transmitter and not to other battery powered devices.

The format for the RTS frame is modified to reflect the fact that it is different from that in normal data transmissions. In one implementation, a broadcast address 0xffff for the RA field in the RTS frame is used. When other devices receive an RTS frame with a broadcast address as RA, the receiving devices recognize the RTS frame as a reservation for power transmission. The receiving devices hence do not reply with a CTS frame and the sender device (mains powered device) for the RTS frame does not expect to receive a CTS frame in that case.

When the duration of NAV (i.e., the duration of power transmission) ends, all devices start the carrier sensing process again. If during a previous NAV period one or more devices desired to transmit data, such devices can compete for the communication medium at the end of the NAV. If there is no data from any devices, the mains powered device can transmit power again after waiting for a PIFS interval.

Because data transmission and power transmission cannot be performed at the same time, it is important to balance the amount of energy transmitted and the latency of the data packets. A long power transmission period may delay data transmission. A short power transmission period may result in devices frequently switching between data transmission and power transmission mode to recharge their batteries, resulting in overhead and more power consumption in switching.

One approach to determine the interval and duration of power transmission is to determine the traffic pattern in the neighborhood, according to an embodiment of the invention. If the traffic pattern is very regular (e.g., in a sensor network where devices update the information periodically), the mains powered device can estimate the time period when the probability of data transmission is very low and use it to transmit power. In a neighborhood with irregular traffic pattern, the mains powered device may analyze the average data transmission time and the minimum/maximum interval between data transmissions, achieving informed selection for the duration of power transmission.

The present invention is suitable for different networks, and not limited to WPAN, WLAN and other standards mentioned in the description herein. As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements. Though the present invention has been described with reference to certain versions thereof; however, other versions are possible. Therefore, the spirit and scope of the appended claims should not be limited to the description of the preferred versions contained herein.

Though the present invention has been described with reference to certain versions thereof; however, other versions are possible. Therefore, the spirit and scope of the appended claims should not be limited to the description of the preferred versions contained herein.

What is claimed is:

1. A method of radio frequency (RF) power transmission in a wireless network including multiple wireless stations, the method comprising:

generating control signals for switching a receiving wireless station between a power reception mode and a data reception mode;

switching the receiving wireless station between power reception and data reception modes based on the control signals comprising a beacon frame providing scheduling information for switching between the power reception mode and the data reception mode; and providing a power inter-frame space interval for generating RF transmission for powering wireless stations in the wireless network wherein:

RF power transmission from one of the multiple wireless stations is processed as energy radiation for powering the receiving wireless station.

2. The method of claim 1, wherein the control signals provide switching information including information about which of the modes to switch to, and information about timing of the switching.

3. The method of claim 2, wherein in the data reception mode, the receiving wireless station processes an RF transmission from a sending wireless station as a data communication, and in the power reception mode the receiving wireless station processes the RF transmission as energy radiation for powering the receiving wireless station.

4. The method of claim 3, wherein the wireless network comprises a WLAN or WPAN network.

5. The method of claim 1 further including:

the receiving wireless station switching between the data receiving and power receiving modes based on the control signals;

in the data reception mode, the receiving wireless station utilizing an RF transmission from a sending wireless station as a data communication; and in the power reception mode, the receiving wireless station utilizing the RF transmission as energy radiation for powering the receiving wireless station.

6. The method of claim 1, wherein utilizing the RF transmission as energy radiation for powering the receiving wireless station further includes: the receiving station utilizing an RF transmission from a coordinator station or from a peer station, as energy radiation for powering the receiving wireless station.

7. The method of claim 1 wherein:
the wireless network comprises a star network such that a sending wireless station functions as a coordinator station; and
utilizing the RF transmission as energy radiation for powering the receiving wireless station further includes: the receiving station utilizing an RF transmission from the coordinator station as energy radiation for powering the receiving wireless station.

8. The method of claim 7 wherein:
the coordinator station generates a beacon frame for the providing of the scheduling information for channel access.

9. The method of claim 1, wherein:
the wireless network comprises a mesh network such that a sending wireless station functions as a peer station; and
utilizing the RF transmission as energy radiation for powering the receiving wireless station further includes: the receiving wireless station utilizing an RF transmission from a peer station as energy radiation for powering the receiving wireless station.

10. The method of claim 1 wherein mains powered wireless stations in the wireless network generate the RF transmission for powering battery powered wireless stations in the wireless network, wherein an RTS frame for power transmission is always transmitted when no RTS frame for data transmission is received after a previous data communication in the network neighborhood.

11. An apparatus for radio frequency (RF) power transmission in a wireless network including multiple wireless stations, comprising:
a controller that operates in a receiving wireless station to generate control signals for switching the receiving wireless station between a power reception mode and a data reception mode based on receiving a beacon frame providing scheduling information for switching between the power reception mode and the data reception mode;
wherein:
the controller comprises a media access control (MAC) layer that provides a power inter-frame space interval for generating RF transmission for powering wireless stations in the wireless network, and
RF power transmission from one of the multiple wireless stations is processed as energy radiation for powering the receiving wireless station.

12. The apparatus of claim 11, wherein, the control signals providing switching information including information about which of the modes to switch to, and information about timing of the switching.

13. The apparatus of claim 11, wherein in the data reception mode, the receiving wireless station processes an RF transmission from a sending wireless station as a data communication, and in the power reception mode the receiving wireless station processes the RF transmission as energy radiation for powering the receiving wireless station.

14. The apparatus of claim 13, wherein the wireless network comprises a WLAN or WPAN network.

15. The apparatus of claim 11, wherein the receiving station utilizes an RF transmission from a coordinator station or from a peer station, as energy radiation for powering the receiving wireless station.

16. The apparatus of claim 11, wherein the wireless network comprises a star network such that a sending wireless station is configured to function as a coordinator station and the receiving station utilizes an RF transmission from the coordinator station as energy radiation for powering the receiving wireless station.

17. The apparatus of claim 13 wherein:
the wireless network comprises a mesh network such that the sending wireless station functions as a peer station; and
the receiving station utilizes an RF transmission from a peer station as energy radiation for powering the receiving wireless station.

18. A wireless communication system for radio frequency (RF) power transmission, comprising:
multiple wireless stations that form a wireless network; and
a controller in a wireless station for RF power transmission, the controller including:
a controller function that generates control signals for switching a receiving wireless station between a power reception mode and a data reception mode based on the receiving wireless station receiving a beacon frame providing scheduling information for switching between the power reception mode and the data reception mode;
wherein:
the controller comprises a media access control (MAC) layer that provides a power inter-frame space interval for generating RF transmission for powering wireless stations in the wireless network, and a physical (PHY) layer for transmitting the generated RF transmission, and
RF power transmission from the controller is processed as energy radiation for powering the receiving wireless station.

19. The system of claim 18, wherein the control signals provide switching information including information about which of the modes to switch to, and information about timing of the switching.

20. The system of claim 19, wherein in the data reception mode, the receiving wireless station processes an RF transmission from a sending wireless station as a data communication, and in the power reception mode the receiving wireless station processes the RF transmission as energy radiation for powering the receiving wireless station.

21. The system of claim 20, wherein the wireless network comprises a WLAN or WPAN network.

22. The system of claim 18, wherein the wireless receiving station: switches between the data receiving and power receiving modes based on the received control signals; in the data reception mode, uses an RF transmission from a sending wireless station as a data communication; and in the power reception mode, uses the RF transmission as energy radiation for powering the receiving wireless station.

23. The system of claim 18, wherein the wireless receiving station utilizes an RF transmission from a coordinator station or from a peer station, as energy radiation for powering the receiving wireless station.

24. The system of claim 18, wherein the wireless network comprises a star network such that the receiving wireless station uses an RF transmission from the sending station as energy radiation for powering the receiving wireless station.

25. The system of claim 18 wherein:
   the wireless network comprises a mesh network such that a sending wireless station functions as a peer station; and
   the receiving wireless station uses an RF transmission from a peer station as energy radiation for powering the receiving wireless station.

26. The system of claim 18, wherein the controller balances duration of power transmission and latency in data transmission by determining traffic pattern in the wireless network, wherein:
   if the communication traffic pattern is regular, then estimating a time period when a probability of data transmission is very low and selecting such timer period for transmitting power to the receiving station; and
   based on the communication pattern, determining an average data transmission time and a minimum/maximum interval between data transmissions, and selecting a time interval for duration of power transmission therefrom.

27. The system of claim 18, wherein battery powered wireless stations in the wireless network are prevented from transmitting data during power transmissions.

28. An apparatus for receiving radio frequency (RF) power transmission in a wireless network including multiple wireless stations, comprising:
   a receiver that receives data, wherein the receiver generates control signals for switching between a power reception mode and a data reception mode, and receives a beacon frame providing scheduling information for switching between the power reception mode and the data reception mode;
   wherein:
      the receiver comprises a media access control (MAC) layer that provides a power inter-frame space interval for generating RF transmission for powering wireless stations in the wireless network, and
      RF power transmission from one of the multiple wireless stations is processed as energy radiation for powering the receiver.

29. A method for receiving radio frequency (RF) power transmission in a wireless network including multiple wireless stations, the method comprising:
   receiving an RF wireless transmission;
   generating control signals for switching a receiving wireless station between a power reception mode and a data reception mode based on the received RF wireless transmission;
   receiving a beacon frame that provides scheduling information for switching between the power reception mode and the data reception mode; and
   switching the receiving wireless station between power reception and data reception modes based on the control signals,
   wherein:
      a power inter-frame space interval is used for generating the RF wireless transmission for powering wireless stations in the wireless network, and
      RF power transmission from one of the multiple wireless stations is processed as energy radiation for powering the receiving wireless station.

30. A wireless node in a wireless network including multiple wireless stations, comprising:
   an interface that switches modes between a power reception circuit and a data reception circuit based on a control signal generated by a controller and a beacon frame providing scheduling information for switching between the power reception circuit and the data reception circuit;
   wherein:
      the interface comprises a media access control (MAC) layer that provides a power inter-frame space interval for generating RF transmission for powering wireless stations in the wireless network, and
      RF power transmission from one of the multiple wireless stations is processed as energy radiation for powering a receiving wireless station.

\* \* \* \* \*